Dec. 18, 1923.
E. YOUNG
1,478,319
ELECTRIC SOLDERING IRON
Filed Feb. 6, 1923
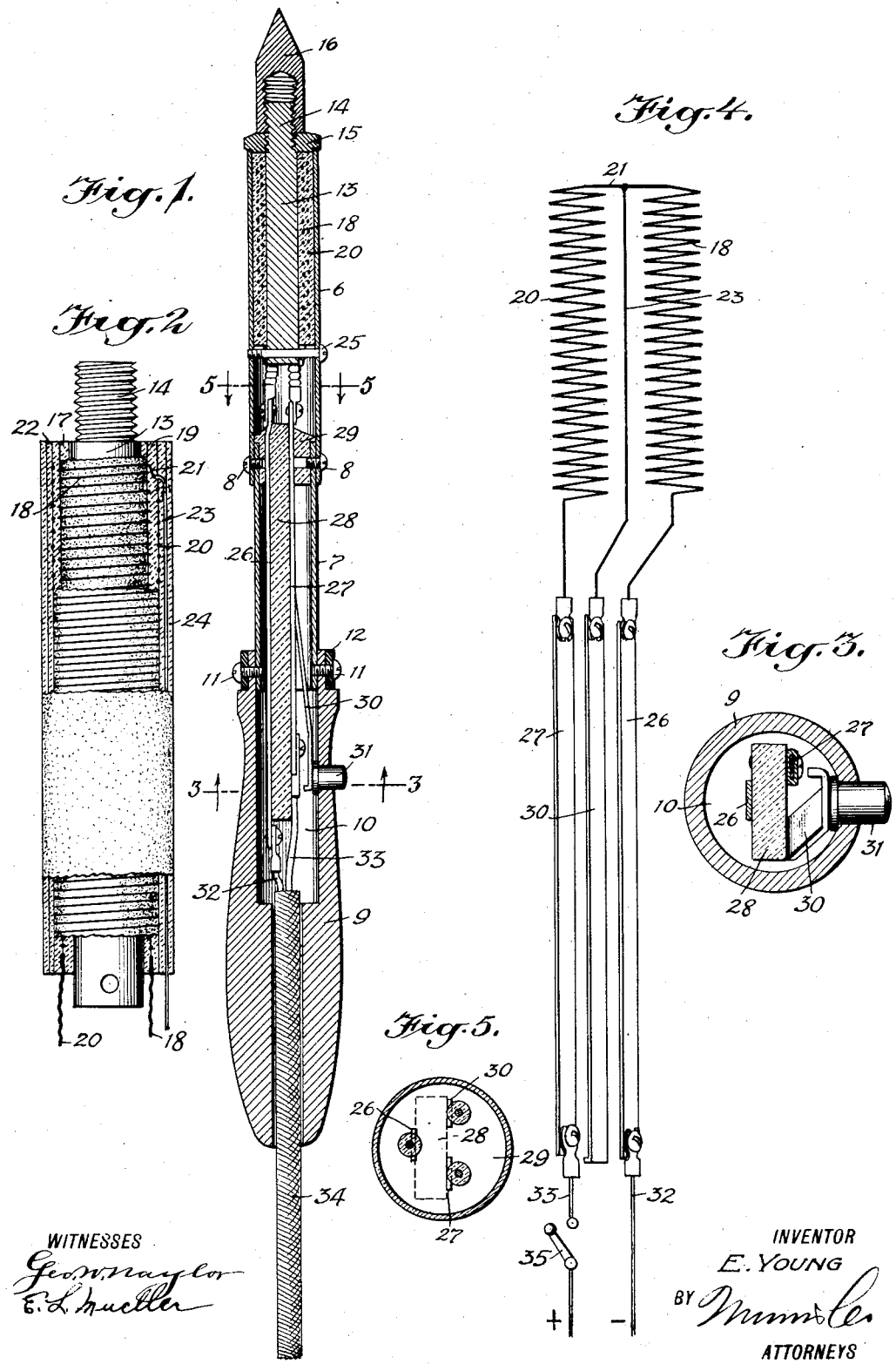
WITNESSES
INVENTOR
E. YOUNG
BY
ATTORNEYS Patented Dec. 18, 1923.

1,478,319

UNITED STATES PATENT OFFICE.

ERNEST YOUNG, OF NEW YORK, N. Y.

ELECTRIC SOLDERING IRON.

Application filed February 6, 1923. Serial No. 617,292.

*To all whom it may concern:*

Be it known that I, ERNEST YOUNG, a citizen of the United States, and a resident of the city of New York, borough of Manhattan, in the county and State of New York, have invented a new and Improved Electric Soldering Iron, of which the following is a full, clear, and exact description.

This invention relates to improvements in soldering irons, and has particular reference to an electric soldering iron.

An object of the invention is to provide an improved soldering iron in which the heat transmitted to the soldering point may be regulated in said manner that when the iron is not in actual operation, but is being heated preparatory to its use, a certain and uniform degree of heat may be applied to said point subsequent to which said heat may be increased to rapidly bring the point to the proper temperature for a soldering operation.

Another object is the provision of soldering iron of comparatively simple and inexpensive construction in which the parts thereof may be readily and quickly assembled.

The above and other objects will appear more clearly from the following detail description, when taken in connection with the accompanying drawing, which illustrates a preferred embodiment of the inventive idea.

In the drawing—

Figure 1 is a longitudinal sectional view through the soldering iron constructed in accordance with the invention;

Figure 2 is a fragmentary enlarged longitudinal sectional view of a portion of the heating device employed in connection with the invention;

Figure 3 is a transverse sectional view on the line 3—3 of Figure 1, showing the relation of the various conducting strips forming a part of the heating device;

Figure 4 is a diagrammatic view of the heating device; and

Figure 5 is a section on the line 5—5 of Figure 1.

Referring more particularly to the accompanying drawing, the numerals 6 and 7 illustrate two tubular sections which combine to form the body portion of the iron and which have adjacent ends telescoping or secured together by means of suitable fasteners, such as screws 8. The outer end of the section 7 has the handle 9 fastened thereto by extending said end into the adjacent end of the longitudinal recess 10 formed in said handle and securing said parts together by the screws 11 which project through an annular ring 12 encircling the adjacent end of the section 7 and handle 9.

The heating device employed in connection with the invention includes an inner core 13 of a suitable heat conducting material mounted within the section 6 and provided with a reduced threaded extension 14 which projects beyond the outer end of said section and receives thereon a nut 15 forming a closure for the outer end of the section, said extension 14 also receiving thereon the internally threaded soldering point 16 which may also be made of any desirable material. An inner layer 17 of suitable material, such as asbestos, encircles the core 13 and has wound thereabout the inner coil 18 forming one of the resistance elements used in connection with the heating device. An intermediate layer 19 of asbestos is then placed about the inner coil 18 and an outer coil 20 forming a second resistance element is then wound about the exterior of the intermediate layer 19, the second resistance element 20 preferably having a greater number of turns than the element 18, as shown in Figure 2. The outer resistance element or coil 20 is surrounded by a second intermediate layer 22 of asbestos and extending along the exterior surface of the layer 22 is a conductor 23, which is joined at one end to the conductor 21 to provide a shunt for the outer resistance element 20 under certain operating conditions, the conductor 23 being surrounded by the outer layer of asbestos 24. The portion of the heating device so far described is secured in position by means of a screw 25 extending through the section 6 and the inner adjacent end of the core 13.

The ends of the resistance elements 18 and 20 opposite those connected by the conductor 21 are connected, respectively, to the conducting strips 26 and 27 which are disposed longitudinally on opposite sides of an element 28 extending through the section 7 and into the opening 10 in the handle 9 and which may also be made of asbestos so as to prevent the heat from the heating unit being transmitted to said handle when the iron is in operation. The outer end of the element 28 is provided with an enlarged head 29 which forms a closure for the outer end of the section 7 and through which the ends of the conducting strips 26 and 27 which are secured to the elements 18 and 20 are extended. A third conducting strip 30 is extended through the enlarged end 29 and connected at one end to the conductor 23, the opposite end of said strip being disposed adjacent to an end of the conducting strip 27, but normally spaced therefrom. The last mentioned end of the conducting strip 30 is engaged by an insulated button or other switching device 31 suitably mounted in the handle 9 so as to be readily engaged by a thumb or finger of the operator, whereby said button may be depressed to engage conducting strip 30 with the strip 27 to include the shunt conductor 23 in circuit with the coil 18 and thereby short circuit the coil 20. The ends of the conducting strips 26 and 27 mounted in the opening 10 of the handle 9 are connected by suitable conductors 32 and 33 to a source of current supply, said conductors 32 and 33 being mounted in an insulating cord 34 which may be attached to a plug which has been indicated diagrammatically in Figure 4 by the switching device 35.

When the source of current is connected to the conducting strips 26 and 27 through the plug or switching device 35, the current flows in series through the coils 18 and 20 and these coils are thereby heated to produce a medium temperature which is sufficient to heat the soldering point 16 to such a degree that the same may be readily and quickly brought to a much higher degree of temperature for the purpose of performing a soldering operation. This higher degree of heat in the soldering point is accomplished by bringing the normally separated contact strips 27 and 30 into engagement with each other through a depression of the button 31 and said strips, when so engaged, operate to shunt the outer resistance element 20 so as to decrease the resistance in the circuit and thereby increase the heat produced by the heating device. By thus regulating the temperature of the soldering point 16, it will be obvious that said point need not be continuously subjected to an extreme heat when the tool is not in actual operation and that said point may be kept at a temperature, when not in actual use, which will be sufficient to permit of the temperature of the point being quickly raised when it is desired to perform a soldering operation.

What is claimed is:

1. In a soldering iron, a body, an insulated support in said body extending longitudinally thereof and having a portion providing a partition for dividing said body into compartments, a heating device in one of said compartments including a plurality of resistance coils, an electrical conducting element connected to each of said coils and carried by said insulated support and extending through said partition, another conducting element also extending through said partition and normally disconnected from the first named conducting elements, said other conducting element forming a part of a shunt for one of said coils, and means for actuating said other conducting element to engage with one of the first named conducting elements to complete said shunt.

2. In a soldering iron, a heating device including a core, inner and outer resistance elements disposed about said core, a shunt for one of said elements normally disconnected therefrom, conducting strips connecting said resistance elements with a source of current supply, another conducting strip connected to said shunt and normally disposed in spaced relation with respect to the first named conducting strips, and a switching device for engaging said other conducting strip with one of the first named strips to include said shunt in circuit with one of said resistance elements whereby to short circuit the other.

3. In a soldering iron, a body portion, a handle secured to one end of said body portion, a heating device including a plurality of resistance elements mounted in said body portion, a shunt for one of said elements, a conducting strip connected to each of said elements and to said shunt, said strips extending longitudinally through said body portion and into said handle, and means carried by said handle for engaging the conducting strip connected to said shunt with one of the other conducting strips to include said shunt in series with one of said resistance elements.

4. In a soldering iron, a body portion, a handle secured to one end of said body portion, a heating device including a plurality of resistance elements mounted in said body portion, a shunt for one of said elements, a conducting strip connected to each of said elements and to said shunt, said strips extending longitudinally through said body portion and into said handle, a heat insulating element for supporting said conducting strips and provided upon one end with an enlargement forming a partition in said body portion, and means carried by said handle for engaging the conducting strip connected to said shunt with one of the other conducting strips to include said shunt in series with one of said resistance elements.

5. In a soldering iron, a body including telescoping sections secured together at their meeting ends, a handle carried by one of said sections, a heating device carried by the other section and including a plurality of resistance elements, a shunt circuit for one of said elements normally disconnected therefrom, conducting strips connected to said heating elements and shunt circuit for connecting the same to a source of current supply, a heat insulating support for said conducting strips having an enlarged end through which said strips extend and which forms a partition in the body adjacent the meeting ends of the sections thereof, and a switching device carried by said handle and operable to engage a pair of said conducting strips to include said shunt circuit in series with one of said resistance elements.

ERNEST YOUNG.